United States Patent
Kamikisaki

(10) Patent No.: US 7,880,428 B2
(45) Date of Patent: Feb. 1, 2011

(54) CONTROLLER FOR INDUCTION MOTOR

(75) Inventor: Sumiyuki Kamikisaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 377 days.

(21) Appl. No.: 12/219,520

(22) Filed: Jul. 23, 2008

(65) Prior Publication Data

US 2009/0033275 A1 Feb. 5, 2009

(30) Foreign Application Priority Data

Jul. 30, 2007 (JP) ............................. 2007-197275

(51) Int. Cl.
*H02P 27/08* (2006.01)
*H02M 7/5387* (2007.01)

(52) U.S. Cl. ..................... 318/811; 318/810; 363/41; 363/98

(58) Field of Classification Search ................ 318/801, 318/803, 810, 811, 599; 363/41–43, 97, 363/98, 132
See application file for complete search history.

(56) References Cited

U.S. PATENT DOCUMENTS

| 4,587,605 A * | 5/1986 | Kouyama et al. ............. 363/41 |
| 4,636,928 A * | 1/1987 | Deguchi et al. ............... 363/41 |
| 4,727,468 A * | 2/1988 | Maekawa .................... 363/41 |
| 4,994,950 A * | 2/1991 | Gritter ......................... 363/41 |
| 6,249,095 B1 * | 6/2001 | Takura .................... 318/400.01 |
| 6,316,895 B1 * | 11/2001 | Ramarathnam ........ 318/400.02 |

FOREIGN PATENT DOCUMENTS

| JP | 5-336791 | 12/1993 |
| JP | 6-213912 | 8/1994 |

* cited by examiner

*Primary Examiner*—Walter Benson
*Assistant Examiner*—Eduardo Colon-Santana
(74) *Attorney, Agent, or Firm*—McGinn IP Law Group, PLLC

(57) ABSTRACT

A controller for an induction motor includes a storage device which stores values in a plurality of addresses, a first counter which transits circularly among first to N-th states, a second counter which transits circularly among first to fourth states, a calculating section which calculates calculation values, and a signal generation section which generates PWM signals and synchronous interruption signals at constant time pitch such that pulse widths of the PWM signals are adjusted based on the calculation values respectively. An inverter supplies electric power to an induction motor based on the PWM signals. The first counter transits from one to next of the first to N-th states synchronously to each of the synchronous interruption signals. The second counter transits from one to next of the first to fourth states synchronously to each transition of the first counter from the N-th state to the first state. The calculating section, synchronously to each of the synchronous interruption signals, calculates one of the calculation values based on the first counter and the second counter from one of the values stored in one of the plurality of addresses.

12 Claims, 14 Drawing Sheets

Fig. 7

| PHASE (ANGLE) | FUNCTION FOR OBTAINING SINE WAVE WAVEFORM |
|---|---|
| $0° \leq \omega t \leq 90°$ (FIRST QUADRANT) | $\sin(\omega t)$ |
| $90° \leq \omega t + 90° \leq 180°$ (SECOND QUADRANT) | $\sin(\omega t + 90°)$ $= \sin(90° - \omega t)$ |
| $180° \leq \omega t + 180° \leq 270°$ (THIRD QUADRANT) | $\sin(\omega t + 180°)$ $= -\sin(\omega t)$ |
| $270° \leq \omega t + 270° \leq 360°$ (FOURTH QUADRANT) | $\sin(\omega t + 270°)$ $= -\sin(90° - \omega t)$ |

Fig. 8

| ADDRESS | PSEUDO SINE WAVE WAVEFORM DATA |
|---|---|
| 0 | APPROXIMATE VALUE OF SIN0° |
| 1 | APPROXIMATE VALUE OF SIN1° |
| 2 | APPROXIMATE VALUE OF SIN2° |
| ⋮ | ⋮ |
| 89 | APPROXIMATE VALUE OF SIN89° |
| 90 | APPROXIMATE VALUE OF SIN90° |

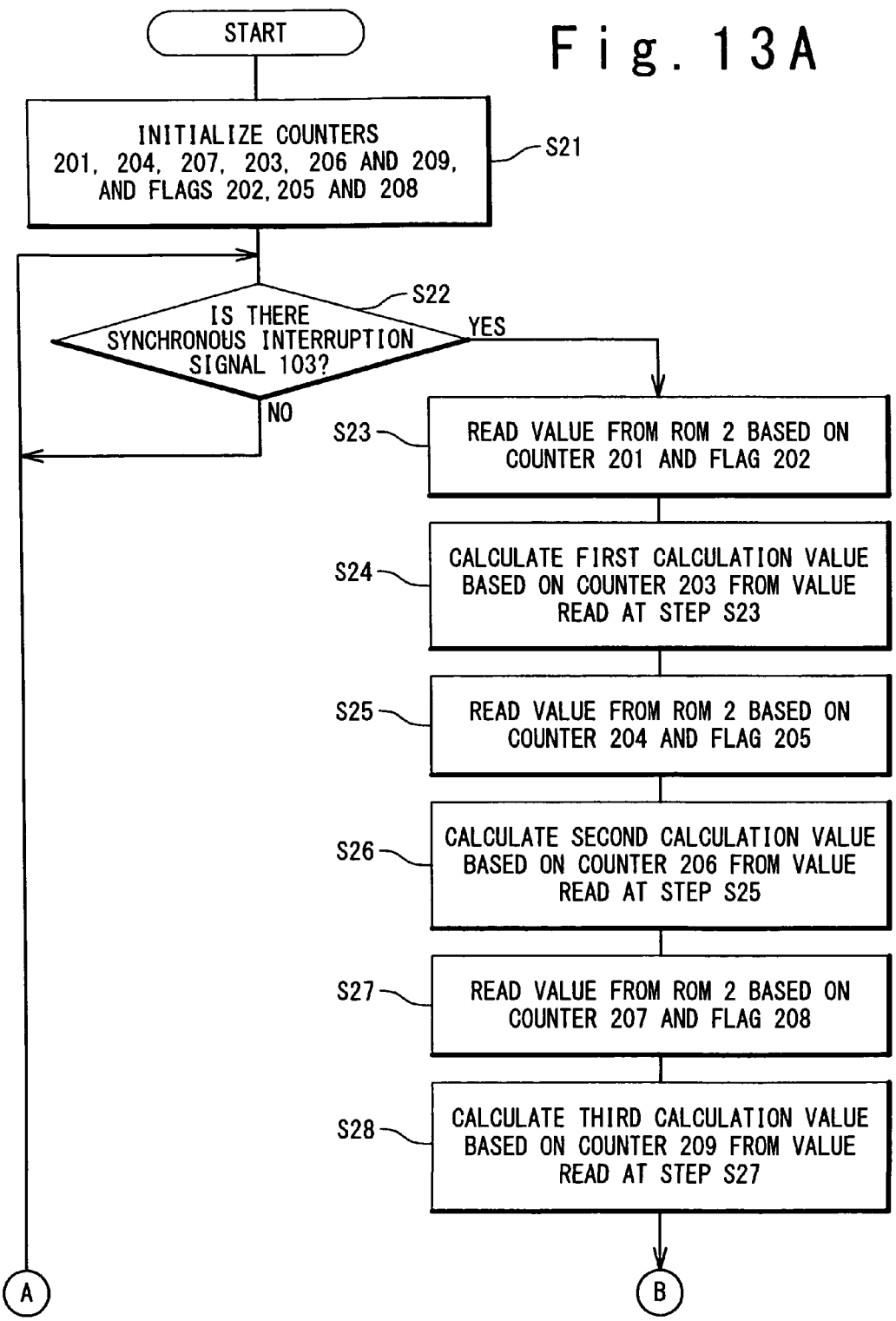

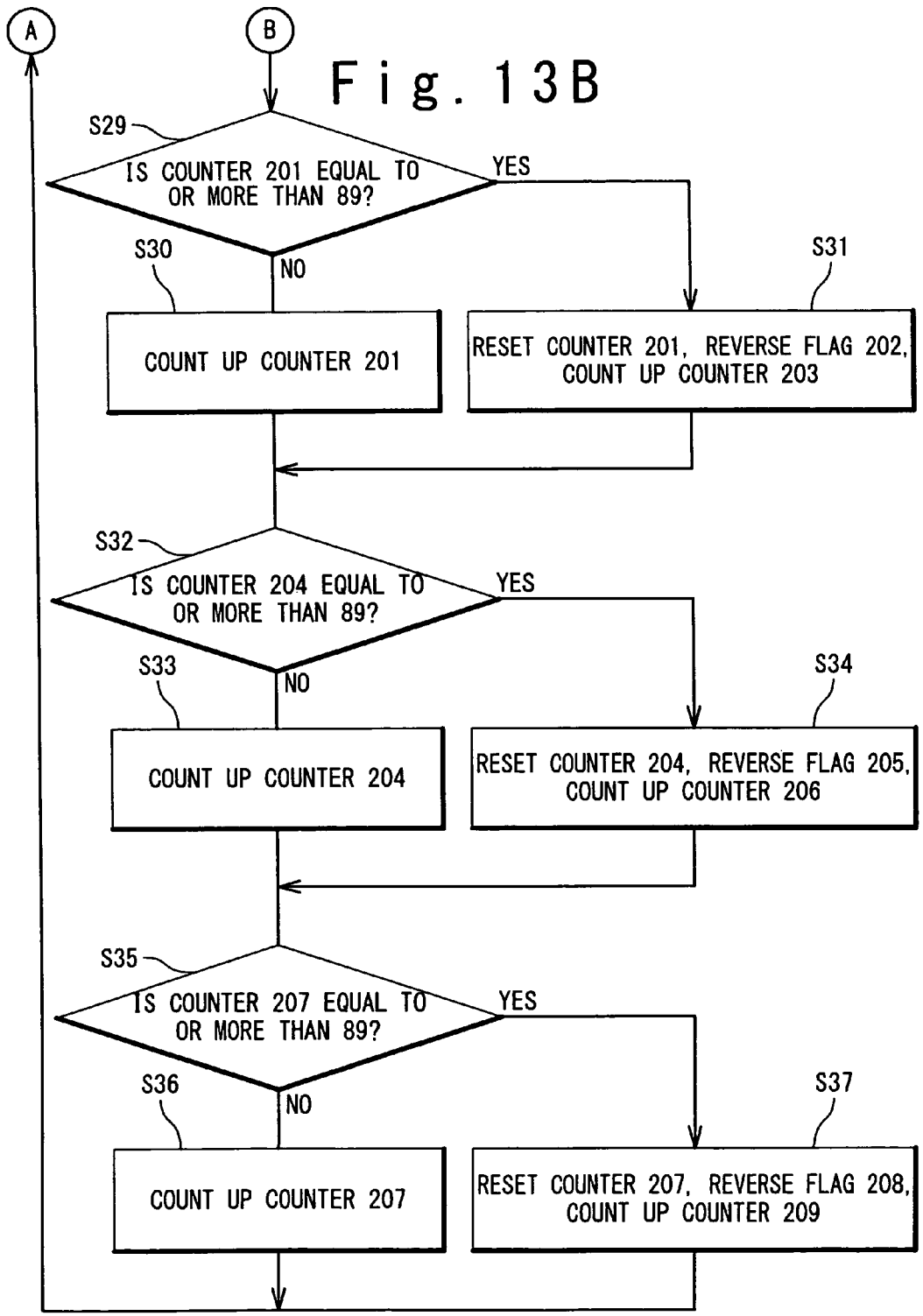

CONTROLLER FOR INDUCTION MOTOR

INCORPORATION BY REFERENCE

This application is based upon and claims the benefit of priority from Japanese patent application No. 2007-197275, filed on Jul. 30, 2007, the disclosure of which is incorporated herein in its entirely by reference.

BACKGROUND OF THE INVENTION

1. Field of the Invention

The present invention relates to a controller for an induction motor and a control method for an induction motor, and especially relates to a speed controller for an induction motor and a speed control method for an induction motor.

2. Description of Related Art

A control method for an induction motor is known in which a sine wave is generated by using a microcomputer and an inverter supplies the induction motor with electric power based on the sine wave. A speed of the induction motor is changed by changing a frequency of the sine wave.

FIG. 1 shows a speed controller for a single-phase induction motor disclosed in Japanese Laid Open Patent Application (JP-A-Heisei 6-213912). A signal inputting section 59 outputs a speed command signal based on a user's operation. A microcomputer 53 outputs digital data indicating sine wave values stored in a ROM table 500 based on the speed command signal. A digital to analog (D/A) converter 52 converts the digital data indicating the sine wave values into a sine wave signal. A triangle wave generator 51 generates a triangle wave signal. A comparator 50 outputs a control signal based on a comparison between the sine wave signal and the triangle wave signal. An inverter 57 supplies alternating current power to a motor 58 based on the control signal. The motor 58 rotates at a rotation speed corresponding to a frequency of the sine wave signal.

The ROM table 500 stores digital data of a sine wave for one period in addresses 0 to 100. As shown in FIG. 2, the addresses 0 to 25 store 80h to FFh as digital data of the sine wave for a quarter of the period, the addresses 25 to 50 store FFh to 80h as digital data for a next quarter of the period, the addresses 50 to 75 store 80h to 00h as digital data for a next quarter of the period, and the addresses 75 to 100 store 00h to 80h as digital data for a next quarter of the period. The symbol "h" indicates a hexadecimal notation.

Japanese Laid Open Patent Application (JP-A-Heisei 5-336791) discloses a servo device which reduces a storage capacity for storing sine wave data by calculating sine wave values and cosine wave values from the sine wave data for (2N+1)/2 period.

The present inventor has recognized that there is a room to reduce data amount of sine wave data used for the control of an induction motor.

SUMMARY

A controller for an induction motor includes a storage device which stores values in a plurality of addresses, a first phase first counter configured to transit circularly among first to N-th states, a first phase second counter configured to transit circularly among first to fourth states, a calculating section configured to calculate first calculation values, and a signal generation section configured to generate first pulse width modulation (PWM) signals for controlling an inverter and synchronous interruption signals at constant time pitch such that pulse widths of the first PWM signals are adjusted based on the first calculation values respectively. The inverter supplies first electric power to an induction motor based on the first PWM signals. The first phase first counter transits from one to next of the first to N-th states synchronously to each of the synchronous interruption signals. The first phase second counter transits from one to next of the first to fourth states synchronously to each transition of the first phase first counter from the N-th state to the first state. The calculating section, synchronously to each of the synchronous interruption signals, calculates one of the first calculation values based on the first phase first counter and the first phase second counter from one of the values stored in one of the plurality of addresses.

A control method for an induction motor includes: generating synchronous interruption signals at constant time pitch; a first phase first counter, synchronously to each of the synchronous interruption signals, transiting from one to next of first to N-th states among which the first phase first counter transits circularly; a first phase second counter, synchronously to each transition of the first phase first counter from the N-th state to the first state, transiting from one to next of first to fourth states among which the first phase second counter transits circularly; calculating first calculation values synchronously to the synchronous interruption signals respectively; and generating first pulse width modulation (PWM) signals for controlling an inverter at the constant time pitch such that pulse widths of the first PWM signals are adjusted based on the first calculation values respectively. The inverter supplies first electric power to an induction motor based on the first PWM signals. One of the first calculation values is calculated based on the first phase first counter and the first phase second counter from a value stored in one of a plurality of addresses of a storage device.

According to the controller for the induction motor and the control method for the induction motor, data amount of sine wave data used for the control of the induction motor is reduced.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 7 is a table showing functions for obtaining a sine wave waveform;

FIG. 8 is a table showing the pseudo sine wave waveform data;

FIG. 13A is a portion of flowchart showing a control method for the induction motor according to the second embodiment;

FIG. 13B is another portion of the flowchart showing the control method for the induction motor according to the second embodiment.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
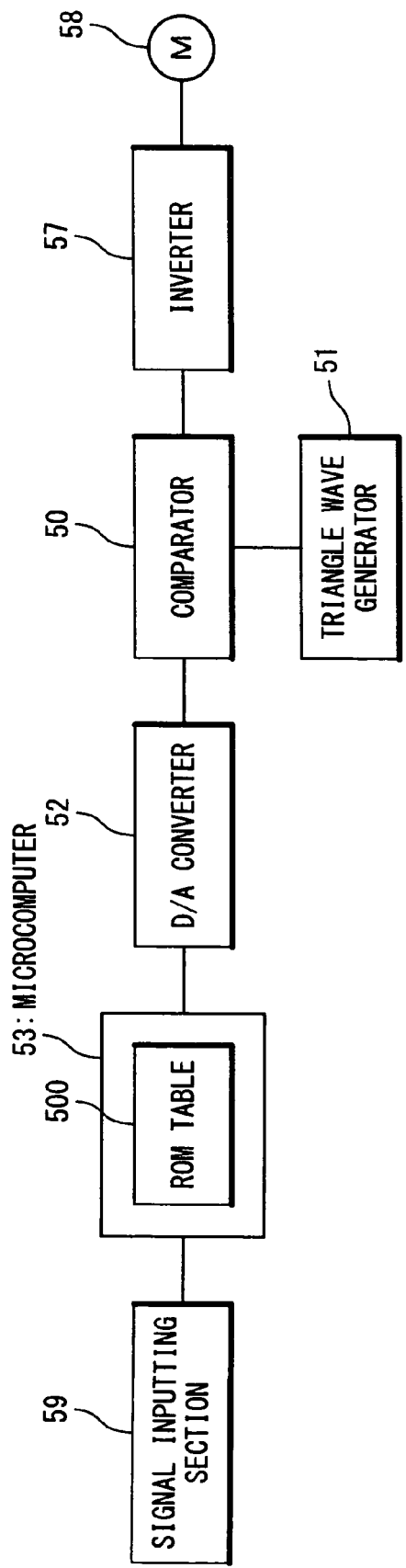
FIG. 1 is a block diagram of a speed controller for a single-phase induction motor.
Figure 2:
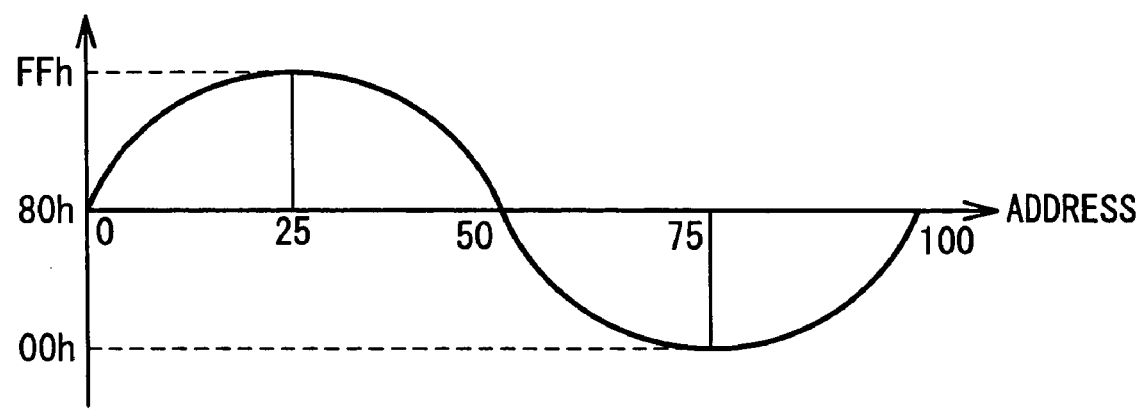
FIG. 2 shows a sine wave waveform corresponding to sine wave sampling values stored in a ROM table in FIG. 1.
Figure 3:
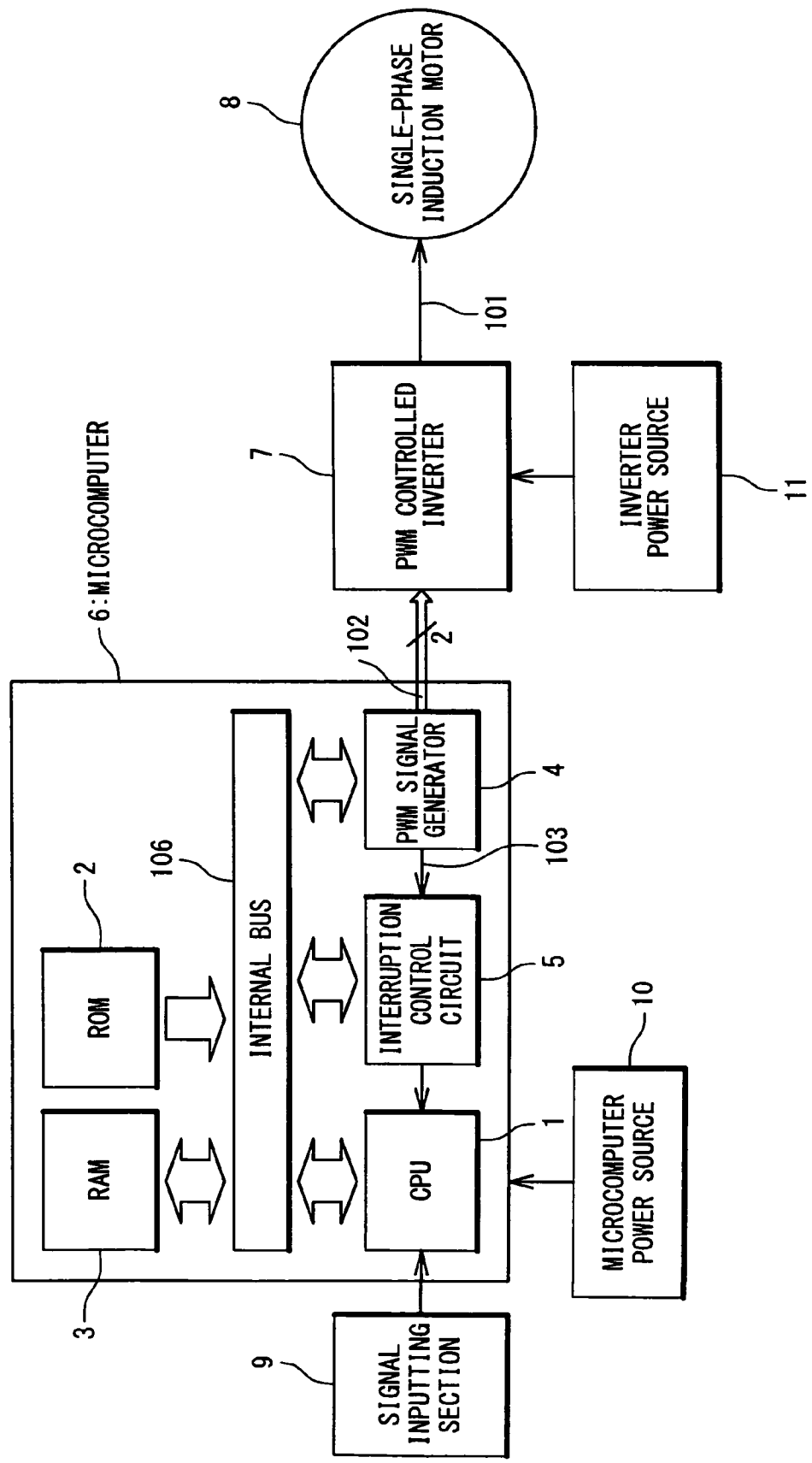
FIG. 3 is a block diagram of a controller for an induction motor according to a first embodiment of the present invention.

FIG. 3 shows a controller for an induction motor according to a first embodiment of the present invention. The controller for the induction motor includes a microcomputer 6, a signal inputting section 9, a microcomputer power source 10, a pulse width modulation (PWM) controlled inverter 7, and an inverter power source 11. The signal inputting section 9 may be referred to as an input section 9 or an input device 9. The microcomputer 6 includes a central processing unit (CPU) 1, a read only memory (ROM) 2, a random access memory (RAM) 3, a pulse width modulation (PWM) signal generator 4 as a signal generation section, an interruption control circuit 5, and an internal bus 106. The CPU 1 may be referred to as a processing device (processing section) 1 or a calculating device (calculating section) 1. The internal bus 106 may be referred to as a signal bus 106. The CPU 1, the ROM 2, the RAM 3, the PWM signal generator 4, and the interruption control circuit 5 are connected to the internal bus 106, respectively. The microcomputer 6 is supplied with electric power for its operation by the microcomputer power source 10. The inverter 7 is connected to the inverter power source 11.

Figure 4:
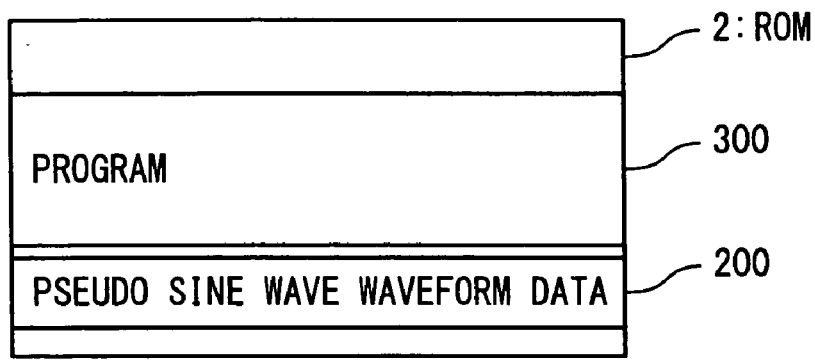
FIG. 4 shows a program and pseudo sine wave waveform data stored in a ROM in FIG. 3.

As shown in FIG. 4, the ROM 2 as a storage device stores pseudo sine wave waveform data 200 and a program 300. The program 300 causes the CPU 1 (or microcomputer 6) to operate. The pseudo sine wave waveform data 200 indicates values corresponding to a sine wave waveform for a phase range from 0° to 90°.

Figure 5:
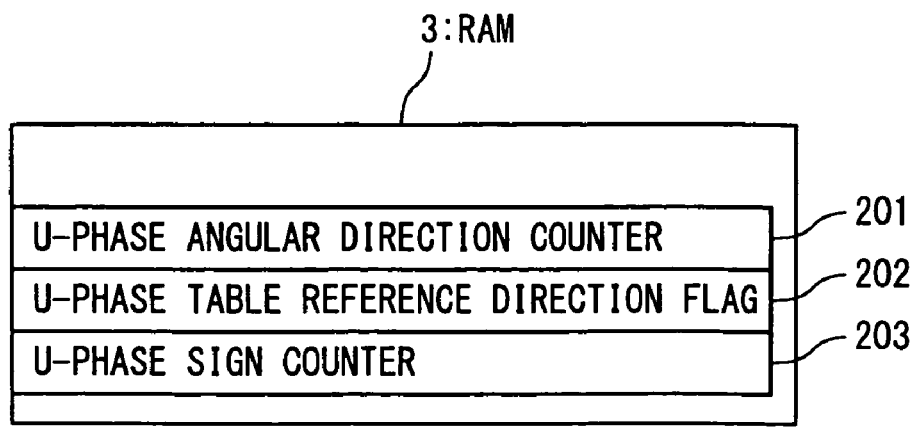
FIG. 5 shows counters and a flag stored in a RAM in FIG. 3.

As shown in FIG. 5, the RAM 3 as a storage device stores a counter 201 as an angular direction counter for a U-phase, a flag 202 as a table reference direction flag for the U-phase, and a counter 203 as a sign counter for the U-phase.

The signal inputting section 9 inputs a target rotation speed of the induction motor 8 and outputs a signal indicating the target rotation speed to the CPU 1. The PWM signal generator 4 generates a synchronous interruption signal 103 at predetermined constant time pitch T and outputs the signal to the interruption control circuit 5. The interruption control circuit 5 informs the CPU 1 of the generation or the output of the synchronous interruption signal 103. The CPU 1 calculates a first calculation value based on the target rotation speed, the pseudo sine wave waveform data 200, the counter 201, the flag 202, and the counter 203 synchronously to (in response to) each generation or each output of the synchronous interruption signal 103. The PWM signal generator 4 generates a pulse width modulation (PWM) signal 102 for each first calculation value such that the pulse width PW of the PWM signal 102 is adjusted based on the first calculation value, and outputs the PWM signal 102 to the inverter 7. The PWM signal generator 4 outputs the pulse width modulation (PWM) signals 102 at the time pitch T. The inverter 7 supplies the induction motor 8 with electric power 101 for driving the induction motor 8 based on the PWM signals 102. The induction motor 8 is a single-phase induction motor.

Figure 6:
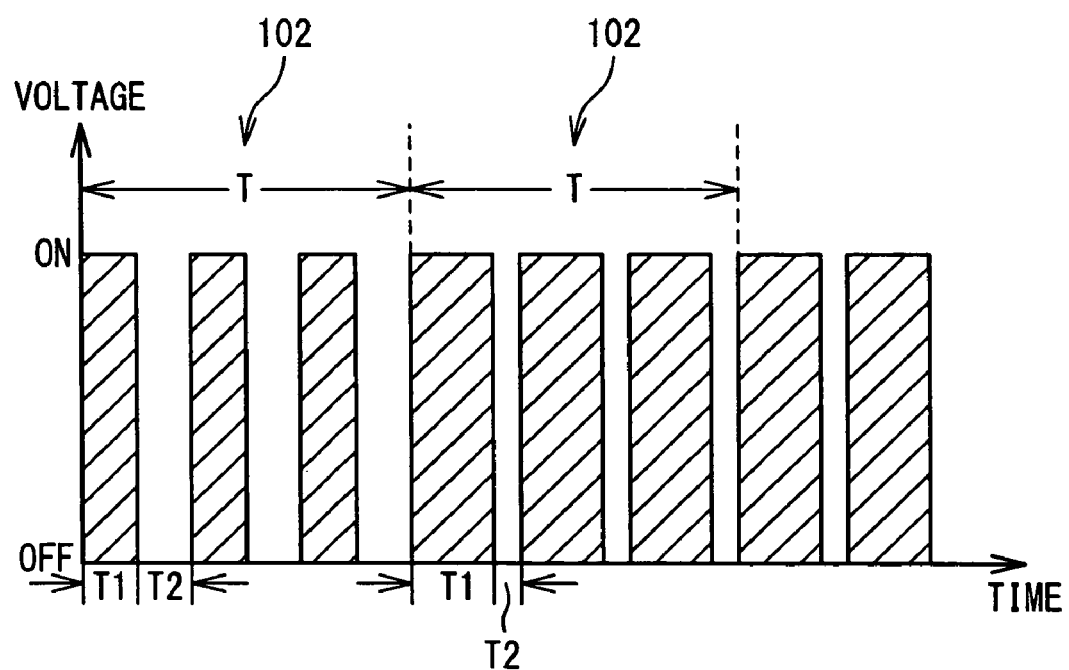
FIG. 6 shows PWM signals.

FIG. 6 shows the PWM signals 102. Each of the PWM signals 102 is outputted for a period of the time pitch T and includes a plurality of voltage pulses. The pulse width PW is defined by a following formula:

$$PW=T1/(T1+T2)$$

where T1 is time when the voltage of the PWM signal 102 is at an ON (HIGH) level and T2 is time when the voltage of the PWM signal 102 is at an OFF (LOW) level. Moreover, there also is a case that each of the PWM signals 102 includes only one voltage pulse. In this case, the time pitch T is expressed by a following formula:

$$T=T1+T2.$$

The first calculation values are calculated so as to correspond to sampling values sampled from the sine wave waveform at the time pitch T. Accordingly, the PWM signals 102 form a pulse width modulation signal whose pulse width changes with time like a sine wave. The induction motor 8 rotates at the rotation speed corresponding to the pulse width modulation signal.

The CPU 1 calculates the first calculation values corresponding to the sine wave waveform for a phase range from 0° to 360° based on values corresponding to the sine wave waveform for the phase range from 0° to 90°.

FIG. 7 shows functions for obtaining the sine wave waveform for the phase range from 0° to 90° (a first quadrant), for the phase range from 90° to 180° (a second quadrant), for the phase range from 180° to 270° (a third quadrant), and for the phase range from 270° to 360° (a forth quadrant). In FIG. 7, ω indicates an angular velocity, and t indicates time. Here, the phase ωt is equal to or more than 0° and equal to or less than 90°. The function for obtaining the sine wave waveform is given by sin (ωt) for the phase range from 0° to 90°. The function for obtaining the sine wave waveform is given by sin (90°−ωt) for the phase range from 90° to 180°. The function for obtaining the sine wave waveform is given by −sin(ωt) for the phase range from 180° to 270°. The function for obtaining the sine wave waveform is given by −sin(90°−ωt) for the phase range from 270° to 360°. Since (90°−ωt) is equal to or more than 0° and equal to or less than 90°, the values corresponding to the sine wave waveform for the phase range from 0° to 360° are obtained when the values corresponding to the sine wave waveform for the phase range from 0° to 90° are given.

Hereinafter, an operation of the CPU 1 will be described in detail.

The counter 201 is a counter of 7 bits, which takes at least 90 states (0 to 89). The flag 202 is a flag of 1 bit, which transits between 2 states (0, 1). The counter 203 is a counter of 2 bits, which transits circularly (cyclically) among 4 states (00b, 01b, 10b, and 11b). The symbol "b" indicates a binary notation.

As shown in FIG. 8, approximate values of sin0° to sin90° are respectively stored in 91 addresses (address 0 to address 90) of the ROM 2 as the pseudo sine wave waveform data 200.

Figure 9:
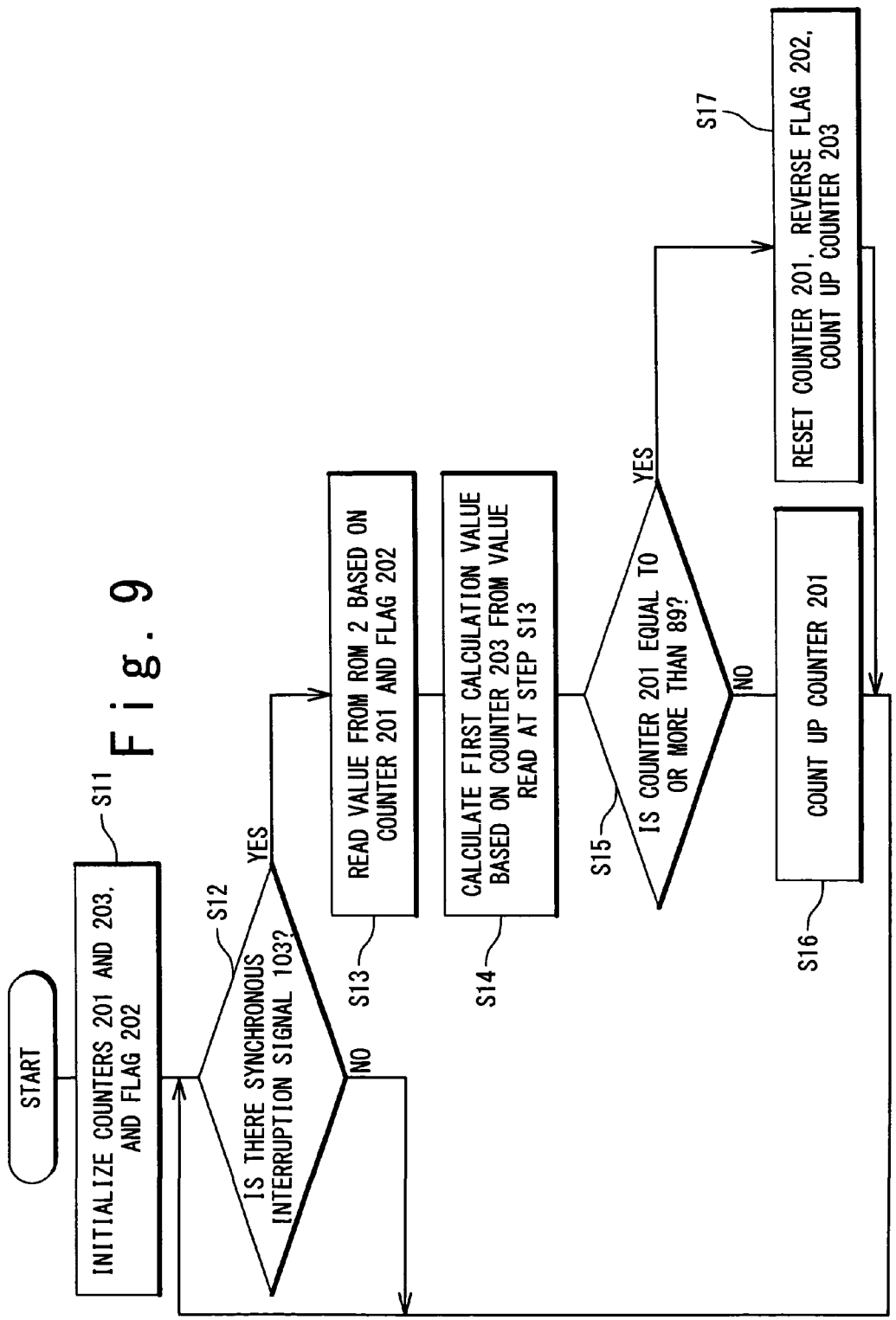
FIG. 9 is a flowchart of a control method for the induction motor according to the first embodiment.

As shown in FIG. 9, a control method for the induction motor according to the first embodiment includes steps S11 to S17.

The CPU 1 initializes the counter 201, the flag 202, and the counter 203 by setting initial values (or initial states) of the counter 201, the flag 202, and the counter 203 (step S11). The CPU 1 sets the counter 201 to 0, sets the flag 202 to 0, and sets the counter 203 to 00b.

The CPU 1 proceeds to step S13 when the generation or the output of the synchronous interruption signal 103 is informed during the control of the induction motor 8 (step S12).

The CPU 1 reads a value from the ROM 2 based on the counter 201 and the flag 202 (step S13). When the counter 201 is K (K is an arbitrary integer of 0 to 89) and the flag 202 is 0, the CPU 1 reads a value stored in an address K of the ROM 2. When the counter 201 is K and the flag 202 is 1, the CPU 1 reads a value stored in an address (90−K) of the ROM 2.

The CPU 1 calculates the first calculation value based on the counter 203 from the value read at step S13 (step S14). When the counter 203 is any of 00b and 01b, the CPU 1 calculates the first calculation value by adding the value read at step S13 to a predetermined center value. The center value is a constant value. When the counter 203 is any of 10b and 11b, the CPU 1 calculates the first calculation value by subtracting the value read at step S13 from the center value.

The CPU 1 refers to the counter 201, and proceeds to step S17 if the counter 201 is 89 or more, or proceeds to step S16 if not (step S15).

The CPU 1 counts up (increments) the counter 201 by 1 (step S16). The CPU 1 returns to step S12.

The CPU 1 resets the counter 201 (sets the counter 201 to 0), reverses the flag 202 (or causes the flag 202 to transit from one to the other of 0 and 1), and counts up (increments) the counter 203 by 1 (step S17). The CPU 1 returns to step S12.

Referring to a timing chart shown in FIG. 10, changes of the counter 201, the flag 202, the counter 203, an address of the ROM 2 from which a value is read, and the first calculation value will be described.

The counter 201 repeats a cycle in which the counter 201 is increased by 1 at every increase from 0 to 89 and is returned from 89 to 0. The counter 201 is changed into the next number (transits to the next state) synchronously to the generation or the output of the synchronous interruption signal 103. The flag 202 is reversed (or transits) between 0 and 1. The flag 202 is reversed at every return of the counter 201 from 89 to 0. The counter 203 repeats a cycle in which the counter 203 is increased by 1 at every increase from 00b to 11b and is returned from 11b to 00b. The counter 203 is changed into the next number (transits to the next state) at every return of the counter 201 from 89 to 0. In time 0T to 90T and 180T to 270T, the values are read from the addresses 0 to 90 in this order (in the order that the number of the address is increased). In time 90T to 180T and 270T to 360T, the values are read from the addresses 0 to 90 in the reverse order (in the order that the number of the address is decreased). The first calculation value changes like a sine wave with centering the center value. A period of the change of the first calculation value is 360T. Accordingly, a relation between a driving frequency f (a rotation frequency) of the induction motor 8 and the time pitch T is given by the following formula:

$$T=1/(f \times 360).$$

A modification of the first embodiment will be described below.

At step S11, the CPU 1 may set the counter 201 to 0, set the flag 202 to 1, and set the counter 203 to 01b. In this case, the first calculation values correspond to a cosine wave waveform.

In addition, the CPU 1 may count up the counter 201 by 2 or 3 based on the target rotation speed at every repetition of step S16, count up the counter 201 by 1 or 3 at every two repetitions of step S16, and count up the counter 201 by 1 or 2 at every three repetitions of step S16. The number by which the CPU 1 counts up the counter 201 is not restricted to the above examples. The rotation speed of the induction motor 8 can be variably controlled by counting up the counter 201 by a number corresponding to the target rotation speed.

Moreover, the controller for the induction motor according to the first embodiment may not include the flag 202. In this case, the CPU 1 reads a value from the ROM 2 based on the counters 201 and 203 at step S13. When the counter 201 is K and the counter 203 is any of 00b and 10b, the CPU 1 reads a value stored in an address K of the ROM 2. When the counter 201 is K and the counter 203 is any of 01b and 11b, the CPU 1 reads a value stored in an address (90−K) of the ROM 2.

Second Embodiment

Figure 11:
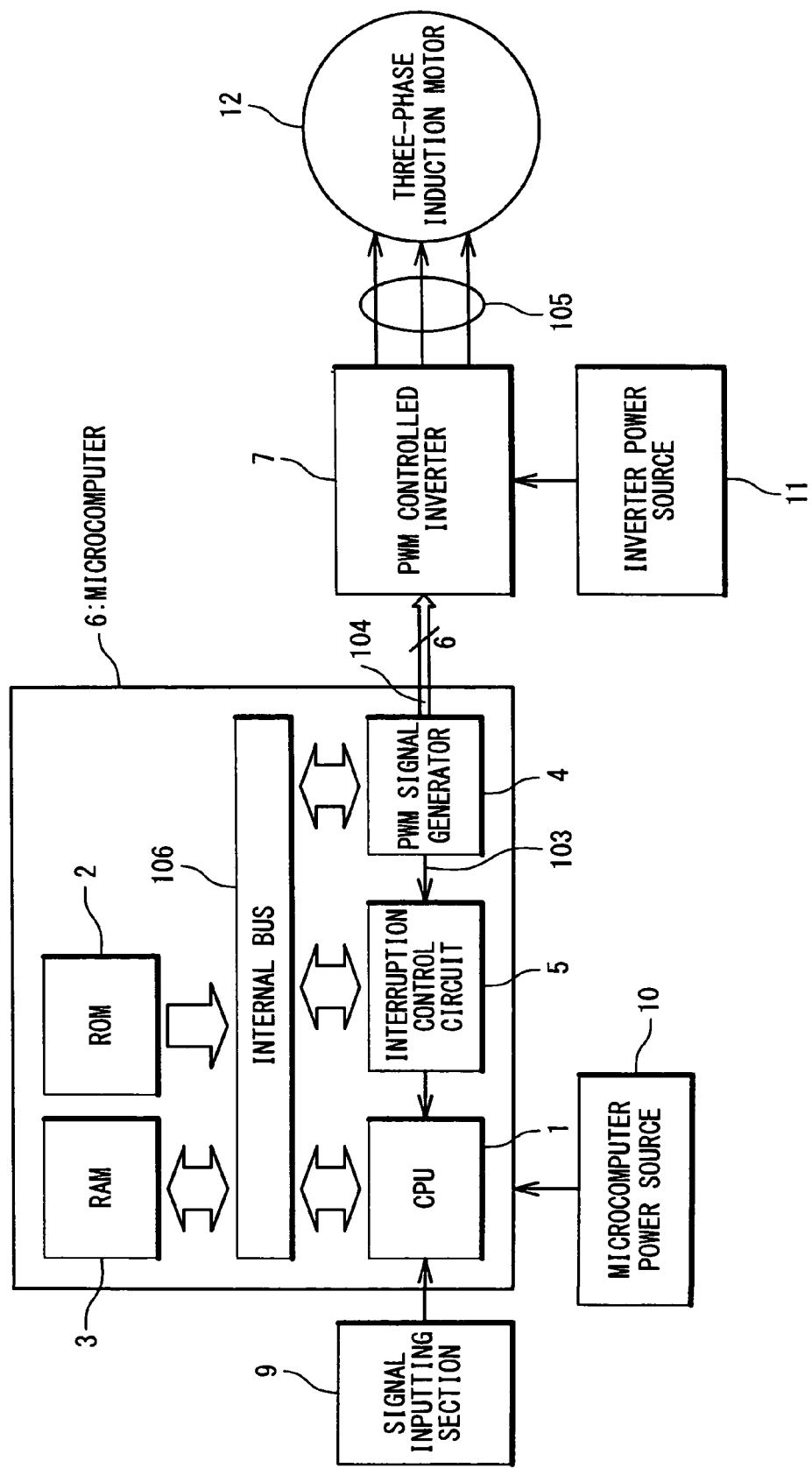
FIG. 11 is a block diagram of a controller for an induction motor according to a second embodiment of the present invention.

FIG. 11 shows a controller for an induction motor according to a second embodiment of the present invention. The controller for the induction motor includes the microcomputer 6, the signal inputting section 9, the microcomputer power source 10, the inverter 7, and the inverter power source 11; and controls an induction motor 12 as a three-phase induction motor.

Figure 12:
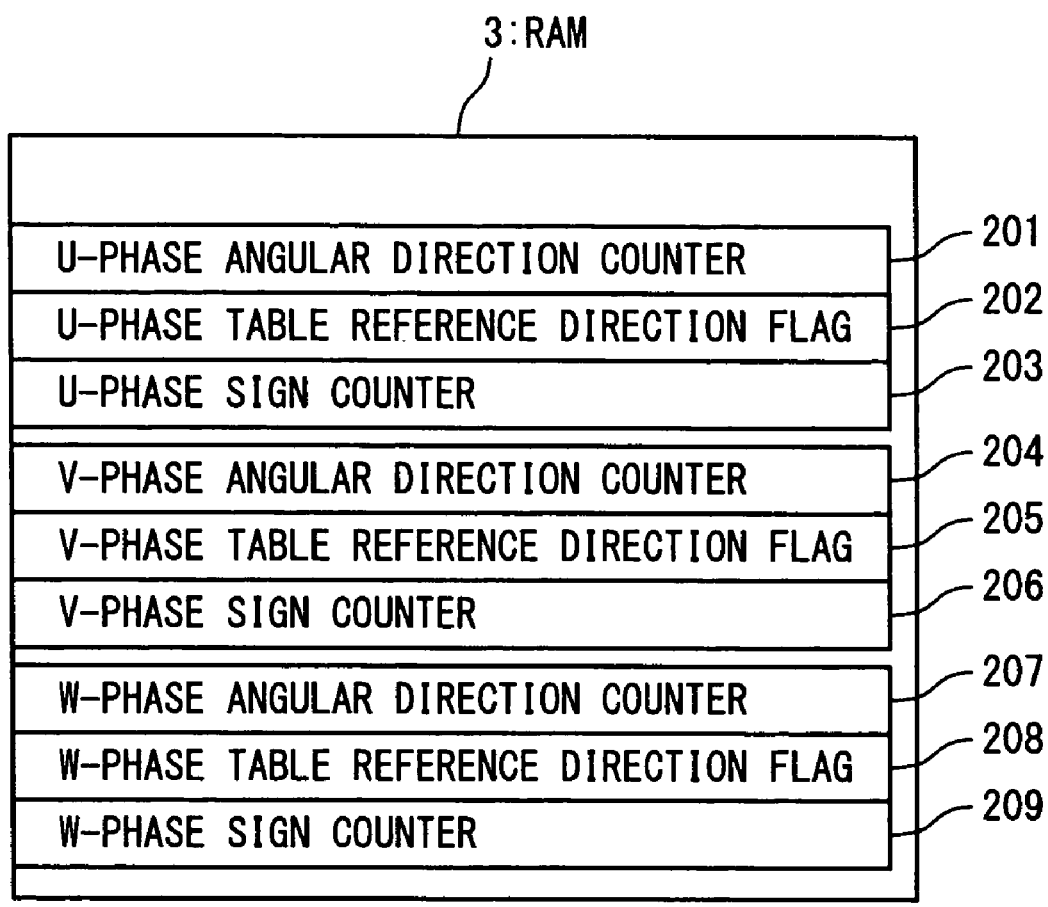
FIG. 12 shows counters and flags stored in a RAM in FIG. 11.

As shown in FIG. 12, the RAM 3 stores a counter 204 as an angular direction counter for a V-phase, a flag 205 as a table reference direction flag for the V-phase, a counter 206 as a sign counter for the V-phase, a counter 207 as an angular direction counter for a W-phase, a flag 208 as a table reference direction flag for the W-phase, and a counter 209 as a sign counter for the W-phase in addition to the counter 201, the flag 202, and the counter 203.

The signal inputting section 9 inputs a target rotation speed of the induction motor 12 and outputs a signal indicating the target rotation speed to the CPU 1. The PWM signal generator 4 generates a synchronous interruption signal 103 at predetermined constant time pitch T and outputs the signal to the interruption control circuit 5. The interruption control circuit 5 informs the CPU 1 of the generation or the output of the synchronous interruption signal 103. The CPU 1 calculates: a first calculation value based on the target rotation speed, the pseudo sine wave waveform data 200, the counter 201, the flag 202, and the counter 203; a second calculation value based on the target rotation speed, the pseudo sine wave waveform data 200, the counter 204, the flag 205, and the counter 206; and a third calculation value based on the target rotation speed, the pseudo sine wave waveform data 200, the counter 207, the flag 208, and the counter 209, synchronously to (in response to) each generation or each output of the synchronous interruption signal 103. The PWM signal generator 4 generates a first pulse width modulation (PWM) signal 104 for each first calculation value such that the pulse width PW of the first PWM signal 104 is adjusted based on the first calculation value, and outputs the first PWM signal 104 to the inverter 7. The PWM signal generator 4 generates a second pulse width modulation (PWM) signal 104 for each second calculation value such that the pulse width PW of the second PWM signal 104 is adjusted based on the second calculation value, and outputs the second PWM signal 104 to the inverter 7. The PWM signal generator 4 generates a third pulse width modulation (PWM) signal 104 for each third calculation value such that the pulse width PW of the third PWM signal 104 is adjusted based on the third calculation value, and outputs the third PWM signal 104 to the inverter 7. The PWM signal generator 4 outputs the first PWM signals 104 at the time pitch T, outputs the second PWM signals 104 at the time pitch T, and outputs the third PWM signals 104 at the time pitch T. The inverter 7 supplies the induction motor 12 with U-phase electric power 105 based on the first PWM signals 104, V-phase electric power 105 based on the second PWM signals 104, and W-phase electric power 105 based on the third PWM signals 104 for driving the induction motor 12.

The CPU 1 calculates the first calculation values, the second calculation values, and the third calculation values corresponding to the sine wave waveform for the phase range from 0° to 360° based on values corresponding to the sine wave waveform for the phase range from 0° to 90°. Each of the first calculation values, the second calculation values, and the third calculation values correspond to the sampling values sampled from the sine wave waveform at the time pitch T. Accordingly, each of the first PWM signals 104, the second PWM signals 104, and the third PWM signals 104 form a pulse width modulation signal whose pulse width changes with time like a sine wave. The induction motor 12 rotates at the rotation speed corresponding to these pulse width modulation signals whose pulse widths change with time like the sine waves.

Hereinafter, an operation of the CPU 1 will be explained in detail.

The counter 201 is a counter of 7 bits, which takes at least 90 states (0 to 89). The flag 202 is a flag of 1 bit, which transits between 2 states (0, 1). The counter 203 is a counter of 2 bits, which transit circularly (cyclically) among 4 states (00b, 01b, 10b, and 11b) The counter 204 is a counter of 7 bits, which takes at least 90 states (0 to 89). The flag 205 is a flag of 1 bit, which transits between 2 states (0, 1). The counter 206 is a counter of 2 bits, which transits circularly (cyclically) among 4 states (00b, 01b, 10b, and 11b). The counter 207 is a counter of 7 bits, which takes at least 90 states (0 to 89). The flag 208 is a flag of 1 bit, which transits between 2 states (0, 1). The counter 209 is a counter of 2 bits, which transits circularly (cyclically) among 4 states (00b, 01b, 10b, and 11b).

As shown in FIGS. 13A and 13B, a control method for the induction motor according to the second embodiment includes steps S21 to S37.

The CPU 1 initializes the counter 201, the flag 202, the counter 203, the counter 204, the flag 205, the counter 206, the counter 207, the flag 208, and the counter 209 by setting initial values (or initial states) of the counters and the flags (step S21). The CPU 1 sets the counter 201 to 0, sets the flag 202 to 0, sets the counter 203 to 00b, sets the counter 204 to 60, sets the flag 205 to 0, sets the counter 206 to 10b, sets the counter 207 to 30, sets the flag 208 to 1, and sets the counter 209 to 01b.

The CPU 1 proceeds to step S23 when the generation or the output of the synchronous interruption signal 103 is informed during the control of the induction motor 12 (step S22).

The CPU 1 reads a value from the ROM 2 based on the counter 201 and the flag 202 (step S23). When the counter 201 is K (K is an arbitrary integer of 0 to 89) and the flag 202 is 0, the CPU 1 reads a value stored in an address K of the ROM 2. When the counter 201 is K and the flag 202 is 1, the CPU 1 reads a value stored in an address (90−K) of the ROM 2.

The CPU 1 calculates the first calculation value based on the counter 203 from the value read at step S13 (step S24). When the counter 203 is any of 00b and 01b, the CPU 1 calculates the first calculation value by adding the value read at step S23 to a predetermined center value. The center value is a constant value. When the counter 203 is any of 10b and 11b, the CPU 1 calculates the first calculation value by subtracting the value read at step S23 from the center value.

The CPU 1 reads a value from the ROM 2 based on the counter 204 and the flag 205 (step S25). When the counter 204 is L (L is an arbitrary integer of 0 to 89) and the flag 205 is 0, the CPU 1 reads a value stored in an address L of the ROM 2. When the counter 204 is L and the flag 205 is 1, the CPU 1 reads a value stored in an address (90−L) of the ROM 2.

The CPU 1 calculates the second calculation value based on the counter 206 from the value read at step S25 (step S26). When the counter 206 is any of 00b and 01b, the CPU 1 calculates the second calculation value by adding the value read at step S25 to the center value. When the counter 206 is any of 10b and 11b, the CPU 1 calculates the second calculation value by subtracting the value read at step S25 from the center value.

The CPU 1 reads a value from the ROM 2 based on the counter 207 and the flag 208 (step S27). When the counter 207 is M (M is an arbitrary integer of 0 to 89) and the flag 208 is 0, the CPU 1 reads a value stored in an address M of the ROM 2. When the counter 207 is M and the flag 205 is 1, the CPU 1 reads a value stored in an address (90−M) of the ROM 2.

The CPU 1 calculates the third calculation value based on the counter 209 from the value read at step S27 (step S28). When the counter 209 is any of 00b and 01b, the CPU 1 calculates the third calculation value by adding the value read at step S27 to the center value. When the counter 209 is any of 10b and 11b, the CPU 1 calculates the third calculation value by subtracting the value read at step S27 from the center value.

The CPU 1 refers to the counter 201, and proceeds to step S31 if the counter 201 is 89 or more, or proceeds to step S30 if not (step S29).

The CPU 1 counts up (increments) the counter 201 by 1 (step S30). The CPU 1 proceeds to step S32.

The CPU 1 resets the counter 201 (sets the counter 201 to 0), reverses the flag 202 (or causes the flag 202 to transit from one to the other of 0 and 1), and counts up (increments) the counter 203 by 1 (step S31). The CPU 1 proceeds to step S32.

The CPU 1 refers to the counter 204, and proceeds to step S34 if the counter 204 is 89 or more, or proceeds to step S33 if not (step S32).

The CPU 1 counts up (increments) the counter 204 by 1 (step S33). The CPU 1 proceeds to step S35.

The CPU 1 resets the counter 204 (sets the counter 204 to 0), reverses the flag 205 (or causes the flag 205 to transit from one to the other of 0 and 1), and counts up (increments) the counter 206 by 1 (step S34). The CPU 1 proceeds to step S35.

The CPU 1 refers to the counter 207, and proceeds to step S37 if the counter 207 is 89 or more, or proceeds to step S36 if not (step S35).

The CPU 1 counts up (increments) the counter 207 by 1 (step S36). The CPU 1 returns to step S22.

The CPU 1 resets the counter 207 (sets the counter 207 to 0), reverses the flag 208 (or causes the flag 208 to transit from one to the other of 0 and 1), and counts up (increments) the counter 209 by 1 (step S37). The CPU 1 returns to step S22.

Figure 14:
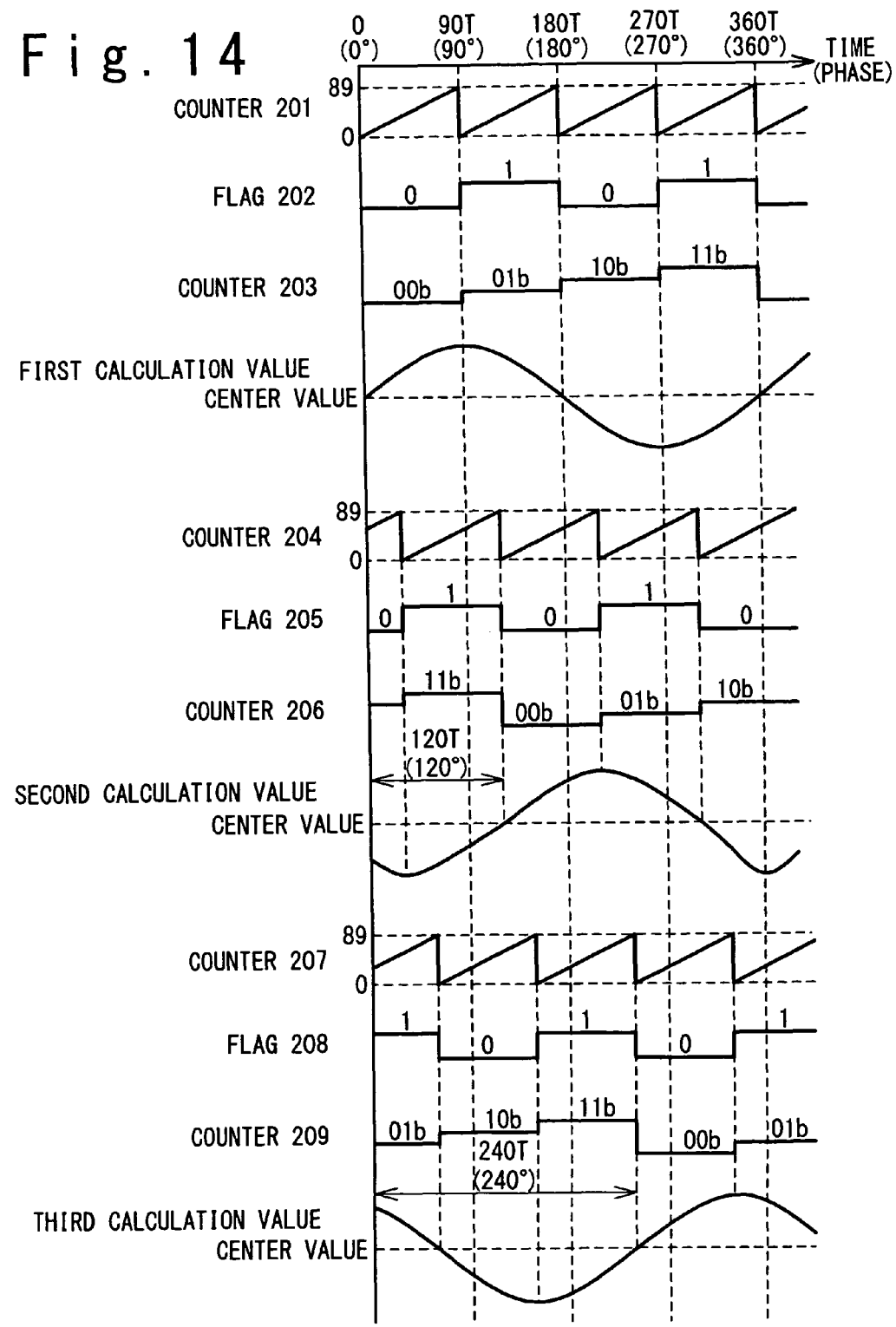
FIG. 14 is a timing chart for the explanation of the control method for the induction motor according to the second embodiment.

Referring to a timing chart shown in FIG. 14, changes of the counter 201, the flag 202, the counter 203, the first calculation value, the counter 204, the flag 205, the counter 206, the second calculation value, the counter 207, the flag 208, the counter 209, and the third calculation value will be described.

Figure 10:
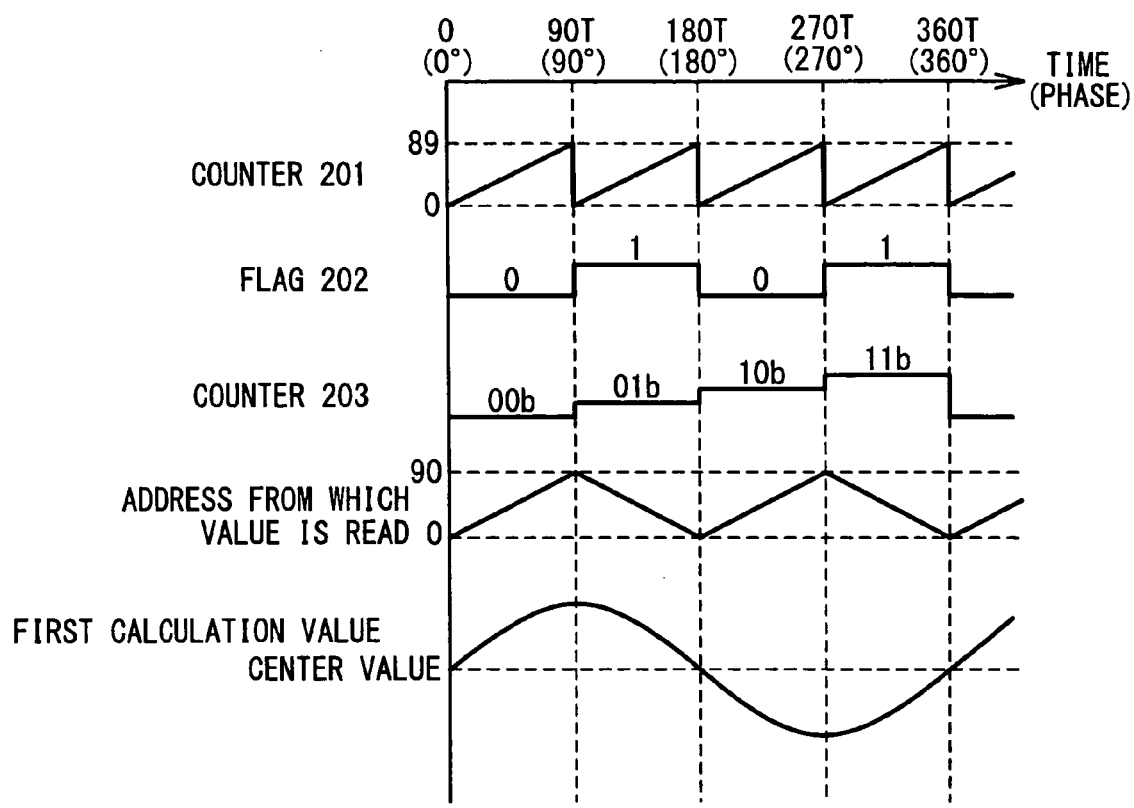
FIG. 10 is a timing chart for the explanation of the control method for the induction motor according to the first embodiment.

The counter 201, the flag 202, the counter 203, and the first calculation value change as described by referring to FIG. 10.

The counter 204 repeats a cycle in which the counter 204 is increased by 1 at every increase from 0 to 89 and is returned from 89 to 0. The counter 204 is changed into the next number (transits to the next state) synchronously to the generation or the output of the synchronous interruption signal 103. The flag 205 is reversed (or transits) between 0 and 1. The flag 205 is reversed at every return of the counter 204 from 89 to 0. The counter 206 repeats a cycle in which the counter 206 is increased by 1 at every increase from 00b to 11b and is returned from 11b to 00b. The counter 206 is changed into the next number (transits to the next state) at every return of the counter 204 from 89 to 0. The second calculation value changes like a sine wave with centering the center value. A period of the change of the second calculation value is 360T.

The counter 207 repeats a cycle in which the counter 207 is increased by 1 at every increase from 0 to 89 and is returned from 89 to 0. The counter 207 is changed into the next number (transits to the next state) synchronously to the generation or the output of the synchronous interruption signal 103. The flag 208 is reversed (or transits) between 0 and 1. The flag 208 is reversed at every return of the counter 207 from 89 to 0. The counter 209 repeats a cycle in which the counter 209 is increased by 1 at every increase from 00b to 11b and is returned from 11b to 00b. The counter 209 is changed into the next number (transits to the next state) at every return of the counter 207 from 89 to 0. The third calculation value changes like a sine wave with centering the center value. A period of the change of the third calculation value is 360T.

According to the setting at step S21, the second calculation value delays in phase by 120° with respect to the first calculation value (the second calculation value delays in time by 120T with respect to the first calculation value). In other words, the second calculation value advances in phase by 240° with respect to the first calculation value. According to the setting at step S21, the third calculation value delays in phase by 240° with respect to the first calculation value (the second calculation value delays in time by 240T with respect to the first calculation value). In other words, the third calculation value advances in phase by 120° with respect to the first calculation value.

At steps S30, S33 and S36, the CPU, based on the target rotation speed, may count up the counter 201 by 2 or 3, count up the counter 204 by 2 or 3, and count up the counter 207 by 2 or 3, respectively. The CPU 1, based on the target rotation speed, may count up the counter 201 by 1 or 3 at every two repetitions of step S30, count up the counter 204 by 1 or 3 at every two repetitions of step S33, and count up the counter 207 by 1 or 3 at every two repetitions of step S36. The CPU 1, based on the target rotation speed, may count up the counter 201 by 1 or 2 at every three repetitions of step S30, count up the counter 204 by 1 or 2 at every three repetitions of step S33, and count up the counter 207 by 1 or 2 at every three repetitions of step S36. The numbers by which the CPU 1 counts up the counters 201, 204, and 207 are not restricted to the above examples. The rotation speed of the induction motor 12 can be variably controlled by counting up the counters 201, 204 and 207 by numbers corresponding to the target rotation speed.

The controller for the induction motor according to the second embodiment may not include the flags 202, 205 and 208. In this case, the CPU 1 reads a value from the ROM 2 based on the counters 201 and 203 at step S23. When the counter 201 is K and the counter 203 is any of 00b and 10b, the CPU 1 reads a value stored in an address K of the ROM 2. When the counter 201 is K and the counter 203 is any of 01b and 11b, the CPU 1 reads a value stored in an address (90−K) of the ROM 2. The CPU 1 reads a value from the ROM 2 based on the counters 204 and 206 at step S25. When the counter 204 is L and the counter 206 is any of 00b and 10b, the CPU 1 reads a value stored in an address L of the ROM 2. When the counter 204 is L and the counter 206 is any of 01b and 11b, the CPU 1 reads a value stored in an address (90−L) of the ROM 2. The CPU 1 reads a value from the ROM 2 based on the counters 207 and 209 at step S27. When the counter 207 is M and the counter 209 is any of 00b and 10b, the CPU 1 reads a value stored in an address M of the ROM 2. When the counter 207 is M and the counter 209 is any of 01b and 11b, the CPU 1 reads a value stored in an address (90−M) of the ROM 2.

Third Embodiment

In the first and second embodiments, data of a waveform (composite waveform) formed by superposing a fundamental sine wave and one or plurality of higher harmonic waves thereof can be used in place of the pseudo sine wave waveform data 200. Thus, the efficiencies of the induction motors 8 and 12 can be improved. Also in this case, values corresponding to the composite waveform for 360° (one period) can be calculated from the data corresponding to the composite waveform for 90° (a quarter of the period).

Fourth Embodiment

Both of sine and cosine waves can be used for controlling the induction motor. The sine and cosine waves also can be generated from the pseudo sine wave waveform data 200 as data for 90° as described above. In this case, initial values of the counters and the flags have to be set appropriately.

In the above descriptions, the counters and the flags are implemented by software. The counters and the flags may be implemented by hardware.

In the above embodiments, the ROM 2 may store values in N+1 addresses, respectively, and each of the counters 201, 204 and 207 may transits circularly (cyclically) among N states synchronously to the generation or the output of the synchronous interruption signal 103. Here, N is an arbitrary natural number. In this case, values to be stored in N+1 addresses are approximate values of $\sin(90°\times((H-1)/N))$. Here, H is any natural number of 1 to N+1. N is preferably greater than 2, 3 or 4.

In addition, when N is a product of three and a natural number J, the second embodiment can be implemented in general. That is to say, N is not restricted to 90 in the second embodiment.

Hereinafter, a reason why the ROM 2 requires only a small storage capacity will be explained by using concrete numeric values. When a ROM stores 512 pieces of 8 bits data corresponding to a sine wave for 360°, 512 bytes of the storage capacity of the ROM is consumed. In the above embodiments, since data corresponding to the sine wave for 90° is enough to control the induction motor, a data amount of data to be stored in the ROM 2 is 128 bytes, quarter of 512 bytes. In addition, 40 bytes is estimated for a data amount of the program 300. Accordingly, 168 bytes of the storage capacity of the ROM 2 is consumed in the above embodiments. According to the above embodiments, the required storage capacity is reduced from 512 bytes to 168 bytes, approximately 67% reduction. Therefore, the ROM 2 requires only a small storage capacity.

It is apparent that the present invention is not limited to the above embodiments, but may be modified and changed without departing from the scope and spirit of the invention.

What is claimed is:

1. A controller for an induction motor comprising:
   a storage device which stores values in a plurality of addresses;

a first phase first counter configured to transit circularly among first to N-th states;

a first phase second counter configured to transit circularly among first to fourth states;

a calculating section configured to calculate first calculation values; and a signal generation section configured to generate first pulse width modulation (PWM) signals for controlling an inverter and synchronous interruption signals at constant time pitch such that pulse widths of said first PWM signals are adjusted based on said first calculation values respectively, wherein said inverter supplies first electric power to an induction motor based on said first PWM signals, said first phase first counter transits from one to next of said first to N-th states synchronously to each of said synchronous interruption signals, said first phase second counter transits from one to next of said first to fourth states synchronously to each transition of said first phase first counter from said N-th state to said first state, and said calculating section, synchronously to each of said synchronous interruption signals, calculates one of said first calculation values based on said first phase first counter and said first phase second counter from one of said values stored in one of said plurality of addresses.

2. The controller for an induction motor according to claim 1, further comprising:

an inputting section configured to input a target rotation speed of said induction motor, wherein said calculating section calculates said first calculation values based on said target rotation speed.

3. The controller for an induction motor according to claim 1, further comprising:

a second phase first counter configured to transit circularly among first to N-th states;

a second phase second counter configured to transit circularly among first to fourth states;

a third phase first counter configured to transit circularly among first to N-th states; and a third phase second counter configured to transit circularly among first to fourth states, wherein said induction motor is a three-phase induction motor, said calculating section calculates second calculation values and third calculation values, said signal generation section generates second pulse width modulation (PWM) signals and third pulse width modulation (PWM) signals at said constant time pitch such that pulse widths of said second PWM signals are adjusted based on said second calculation values respectively and pulse widths of said third PWM signals are adjusted based on said third calculation values respectively, said inverter supplies second electric power to said induction motor based on said second PWM signals and supplies third electric power to said induction motor based on said third PWM signals, said second phase first counter transits from one to next of said first to N-th states synchronously to each of said synchronous interruption signals, said second phase second counter transits from one to next of said first to fourth states synchronously to each transition of said second phase first counter from said N-th state to said first state, said third phase first counter transits from one to next of said first to N-th states synchronously to each of said synchronous interruption signals, said third phase second counter transits from one to next of said first to fourth states synchronously to each transition of said third phase first counter from said N-th state to said first state, said calculating section, synchronously to each of said synchronous interruption signals, calculates one of said second calculation values based on said second phase first counter and said second phase second counter from one of values stored in one of said plurality of addresses, and said calculating section, synchronously to each of said synchronous interruption signals, calculates one of said third calculation values based on said third phase first counter and said third phase second counter from one of values stored in one of said plurality of addresses.

4. The controller for an induction motor according to claim 1, further comprising:

a first flag configured to transit between first and second states, wherein said first flag transits from one to another of said first and second states synchronously to each transition of said first phase first counter from said N-th state to said first state, said plurality of addresses includes first to (N+1)-th addresses, K is an arbitrary integer from 1 to N, said calculating section calculates one of said first calculation values by adding a value stored in a K-th address of said storage device to a constant value when said first phase first counter is a K-th state, said first flag is said first state and said first phase second counter is said first state, said calculating section calculates one of said first calculation values by adding a value stored in a (N+2−K)-th address of said storage device to said constant value when said first phase first counter is said K-th state, said first flag is said second state and said first phase second counter is said second state, said calculating section calculates one of said first calculation values by subtracting said value stored in said K-th address of said storage device from said constant value when said first phase first counter is said K-th state, said first flag is said first state and said first phase second counter is said third state, and said calculating section calculates one of said first calculation values by subtracting said value stored in said (N+2−K)-th address of said storage device from said constant value when said first phase first counter is said K-th state, said first flag is said second state and said first phase second counter is said fourth state.

5. The controller for an induction motor according to claim 4, further comprising:

a second phase first counter configured to transit circularly among first to N-th states;

a second flag configured to transit between first and second states, a second phase second counter configured to transit circularly among first to fourth states;

a third phase first counter configured to transit circularly among first to N-th states;

a third flag configured to transit between first and second states; and a third phase second counter configured to transit circularly among first to fourth states, wherein said induction motor is a three-phase induction motor, said calculating section calculates second calculation values and third calculation values, said signal generation section generates second pulse width modulation (PWM) signals and third pulse width modulation (PWM) signals at said constant time pitch such that pulse widths of said second PWM signals are adjusted based on said second calculation values respectively and pulse widths of said third PWM signals are adjusted based on said third calculation values respectively, said inverter supplies second electric power to said induction motor based on said second PWM signals and supplies third electric power to said induction motor based on said third PWM signals, said second phase first counter transits from one to next of said first to N-th states synchronously to each of said synchronous interruption signals, said second flag transit from one to another of said first and second states synchronously to each transition of said second phase first counter from said N-th state to said first state, said second phase second counter transits from one to next of said first to fourth states synchronously to each transition of said second phase first counter from said N-th state to said first state, said third phase first counter transits from one to next of said first to N-th states synchronously to each of said synchronous interruption signals, said third flag transits from one to another of said first and second states synchronously to each transition of said third phase first counter from said N-th state to said first state, said third phase second counter transits from one to next of said first to fourth states synchronously to each transition of said third phase first counter from said N-th state to said first state, said calculating section, synchronously to each of said synchronous interruption signals, calculates one of said second calculation values from one of values stored in one of said plurality of addresses, said calculating section, synchronously to each of said synchronous interruption signals, calculates one of said third calculation values from one of values stored in one of said plurality of addresses, L is an arbitrary integer from 1 to N, said calculating section calculates one of said second calculation values by adding a value stored in an L-th address of said storage device to said constant value when said second phase first counter is an L-th state, said second flag is said first state and said second phase second counter is said first state, said calculating section calculates one of said second calculation values by adding a value stored in a (N+2−L)-th address of said storage device to said constant value when said second phase first counter is said L-th state, said second flag is said second state and said second phase second counter is said second state, said calculating section calculates one of said second calculation values by subtracting said value stored in said L-th address of said storage device from said constant value when said second phase first counter is said L-th state, said second flag is said first state and said second phase second counter is said third state, said calculating section calculates one of said second calculation values by subtracting said value stored in said (N+2−L)-th address of said storage-device from said constant value when said second phase first counter is said L-th state, said second flag is said second state and said second phase second counter is said fourth state, M is an arbitrary integer from 1 to N, said calculating section calculates one of said third calculation values by adding a value stored in an M-th address of said storage device to said constant value when said third phase first counter is an M-th state, said third flag is said first state and said third phase second counter is said first state, said calculating section calculates one of said third calculation values by adding a value stored in a (N+2−M)-th address of said storage device to said constant value when said third phase first counter is said M-th state, said third flag is said second state and said third phase second counter is said second state, said calculating section calculates one of said third calculation values by subtracting said value stored in said M-th address of said storage device from said constant value when said third phase first counter is said M-th state, said third flag is said first state and said third phase second counter is said third state, and said calculating section calculates one of said third calculation values by subtracting said value stored in said (N+2−M)-th address of said storage device from said constant value when said third phase first counter is said M-th state, said third flag is said second state and said third phase second counter is said fourth state.

6. The controller for an induction motor according to claim 5, wherein N is a product of a natural number J and 3, said first phase first counter, said first flag, said first phase second counter, said second phase first counter, said second flag, said second phase second counter, said third phase first counter, said third flag and said third phase second counter are set such that said second phase first counter is a (2J+1)-th state, said second flag is said first state, said second phase second counter is said third state, said third phase first counter is a (J+1)-th state, said third flag is said second state, and said third phase second counter is said second state when said first phase first counter is said first state, said first flag is said first state and said first phase second counter is said first state.

7. A control method for an induction motor comprising:

generating synchronous interruption signals at constant time pitch;

a first phase first counter, synchronously to each of said synchronous interruption signals, transiting from one to next of first to N-th states among which said first phase first counter transits circularly;

a first phase second counter, synchronously to each transition of said first phase first counter from said N-th state to said first state, transiting from one to next of first to fourth states among which said first phase second counter transits circularly;

calculating first calculation values synchronously to said synchronous interruption signals respectively; and generating first pulse width modulation (PWM) signals for controlling an inverter at said constant time pitch such that pulse widths of said first PWM signals are adjusted based on said first calculation values respectively, wherein said inverter supplies first electric power to an induction motor based on said first PWM signals, and one of said first calculation values is calculated based on said first phase first counter and said first phase second counter from a value stored in one of a plurality of addresses of a storage device.

8. The control method for an induction motor according to claim 7, further comprising:
  inputting a target rotation speed of said induction motor,
  wherein said first calculation values are calculated based on said target rotation speed.

9. The control method for an induction motor according to claim 7, further comprising:
  a second phase first counter, synchronously to each of said synchronous interruption signals, transiting from one to next of first to N-th states among which said second phase first counter transits circularly;
  a second phase second counter, synchronously to each transition of said second phase first counter from said N-th state to said first state, transiting from one to next of first to fourth states among which said second phase second counter transits circularly;
  a third phase first counter, synchronously to each of said synchronous interruption signals, transiting from one to next of first to N-th states among which said third phase first counter transits circularly;
  a third phase second counter, synchronously to each transition of said third phase first counter from said N-th state to said first state, transiting from one to next of first to fourth states among which said third phase second counter transits circularly;
  calculating second calculation values synchronously to said synchronous interruption signals respectively;
  calculating third calculation values synchronously to said synchronous interruption signals respectively;
  generating second pulse width modulation (PWM) signals at said constant time pitch such that pulse widths of said second PWM signals are adjusted based on said second calculation values respectively; and
  generating third pulse width modulation (PWM) signals at said constant time pitch such that pulse widths of said third PWM signals are adjusted based on said third calculation values respectively,
  wherein said induction motor is a three-phase induction motor,
  said inverter supplies second electric power to said induction motor based on said second PWM signals and supplies third electric power to said induction motor based on said third PWM signals,
  one of said second calculation values is calculated based on said second phase first counter and said second phase second counter from a value stored in one of said plurality of addresses, and
  one of said third calculation values is calculated based on said third phase first counter and said third phase second counter from a value stored in one of said plurality of addresses.

10. The control method for an induction motor according to claim 7, further comprising:
  a first flag, synchronously to each transition of said first phase first counter from said N-th state to said first state, transiting from one to another of first and second states between which said first flag transits,
  wherein said plurality of addresses includes first to (N+1)-th addresses,
  K is an arbitrary integer from 1 to N,
  one of said first calculation values is calculated by adding a value stored in a K-th address of said storage device to a constant value when said first phase first counter is a K-th state, said first flag is said first state and said first phase second counter is said first state,
  one of said first calculation values is calculated by adding a value stored in a (N+2−K)-th address of said storage device to said constant value when said first phase first counter is said K-th state, said first flag is said second state and said first phase second counter is said second state,
  one of said first calculation values is calculated by subtracting said value stored in said K-th address of said storage device from said constant value when said first phase first counter is said K-th state, said first flag is said first state and said first phase second counter is said third state, and
  one of said first calculation values is calculated by subtracting said value stored in said (N+2−K)-th address of said storage device from said constant value when said first phase first counter is said K-th state, said first flag is said second state and said first phase second counter is said fourth state.

11. The control method for an induction motor according to claim 7, further comprising:
  a second phase first counter, synchronously to each of said synchronous interruption signals, transiting from one to next of first to N-th states among which said second phase first counter transits circularly;
  a second flag, synchronously to each transition of said second phase first counter from said N-th state to said first state, transiting from one to another of first and second states between which said second flag transits,
  a second phase second counter, synchronously to each transition of said second phase first counter from said N-th state to said first state, transiting from one to next of first to fourth states among which said second phase second counter transits circularly;
  a third phase first counter, synchronously to each of said synchronous interruption signals, transiting from one to next of first to N-th states among which said third phase first counter transits circularly;
  a third flag, synchronously to each transition of said third phase first counter from said N-th state to said first state, transiting from one to another of first and second states between which said third flag transits,
  a third phase second counter, synchronously to each transition of said third phase first counter from said N-th state to said first state, transiting from one to next of first to fourth states among which said third phase second counter transits circularly;
  calculating second calculation values synchronously to said synchronous interruption signals respectively;
  calculating third calculation values synchronously to said synchronous interruption signals respectively;
  generating second pulse width modulation (PWM) signals at said constant time pitch such that pulse widths of said second PWM signals are adjusted based on said second calculation values respectively; and
  generating third pulse width modulation (PWM) signals at said constant time pitch such that pulse widths of said third PWM signals are adjusted based on said third calculation values respectively,
  wherein said induction motor is a three-phase induction motor,
  said inverter supplies second electric power to said induction motor based on said second PWM signals and supplies third electric power to said induction motor based on said third PWM signals,
  L is an arbitrary integer from 1 to N,
  one of said second calculation values is calculated by adding a value stored in an L-th address of said storage device to said constant value when said second phase first counter is an L-th state, said second flag is said first state and said second phase second counter is said first state, one of said second calculation values is calculated by adding a value stored in a (N+2−L)-th address of said storage device to said constant value when said second phase first counter is said L-th state, said second flag is said second state and said second phase second counter is said second state, one of said second calculation values is calculated by subtracting said value stored in said L-th address of said storage device from said constant value when said second phase first counter is said L-th state, said second flag is said first state and said second phase second counter is said third state, one of said second calculation values is calculated by subtracting said value stored in said (N+2−L)-th address of said storage device from said constant value when said second phase first counter is said L-th state, said second flag is said second state and said second phase second counter is said fourth state, M is an arbitrary integer from 1 to N, one of said third calculation values is calculated by adding a value stored in an M-th address of said storage device to said constant value when said third phase first counter is an M-th state, said third flag is said first state and said third phase second counter is said first state, one of said third calculation values is calculated by adding a value stored in a (N+2−M)-th address of said storage device to said constant value when said third phase first counter is said M-th state, said third flag is said second state and said third phase second counter is said second state, one of said third calculation values is calculated by subtracting said value stored in said M-th address of said storage device from said constant value when said third phase first counter is said M-th state, said third flag is said first state and said third phase second counter is said third state, and one of said third calculation values is calculated by subtracting said value stored in said (N+2−M)-th address of said storage device from said constant value when said third phase first counter is said M-th state, said third flag is said second state and said third phase second counter is said fourth state.

12. The control method for an induction motor according to claim 11, further comprising:

setting said first phase first counter, said first flag, said first phase second counter, said second phase first counter, said second flag, said second phase second counter, said third phase first counter, said third flag and said third phase second counter such that said second phase first counter is a (2J+1)-th state, said second flag is said first state, said second phase second counter is said third state, said third phase first counter is a (J+1)-th state, said third flag is said second state, and said third phase second counter is said second state when said first phase first counter is said first state, said first flag is said first state and said first phase second counter is said first state, wherein N is a product of J as a natural number and 3.

* * * * *